United States Patent [19]
Birman

[11] Patent Number: 5,683,109
[45] Date of Patent: Nov. 4, 1997

[54] TWO PIECE AIR BAG WITH BUILT IN TETHER

[75] Inventor: Mor Birman, Romeo, Mich.

[73] Assignee: AlliedSignal Inc., Morristown, N.J.

[21] Appl. No.: 551,083

[22] Filed: Oct. 31, 1995

[51] Int. Cl.⁶ .................................................. B60R 21/20
[52] U.S. Cl. ................................. 280/743.2; 280/742
[58] Field of Search ........................... 280/743.2, 742, 280/728.2, 729, 736, 740

[56] References Cited

U.S. PATENT DOCUMENTS

| | | |
|---|---|---|
| 4,988,118 | 1/1991 | Good et al. ........................ 280/743 |
| 5,022,675 | 6/1991 | Zelenak, Jr. et al. ............... 280/743.1 |

FOREIGN PATENT DOCUMENTS

| | | | |
|---|---|---|---|
| 0247242 | 3/1988 | Japan ........................... 280/743 A |
| 1438032 | 7/1973 | United Kingdom ............ 280/743 |
| 2271322 | 4/1994 | United Kingdom ............ 280/743 |

*Primary Examiner*—Brian L. Johnson
*Assistant Examiner*—Jonathan E. Butts
*Attorney, Agent, or Firm*—Markell Seitzman

[57] ABSTRACT

An air bag (12) utilizing only two pieces (10a,b) of joined-together material having a front face (43c), two sides (43a, 43b), a neck (48) and a hollow tether (45).

14 Claims, 3 Drawing Sheets

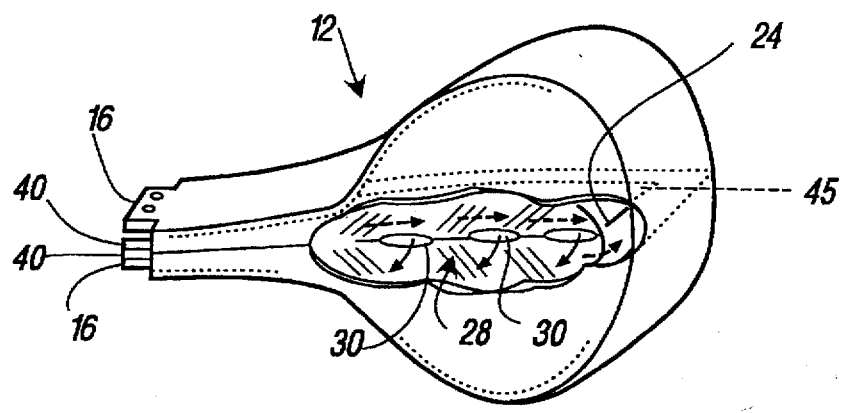
FIG. - 9
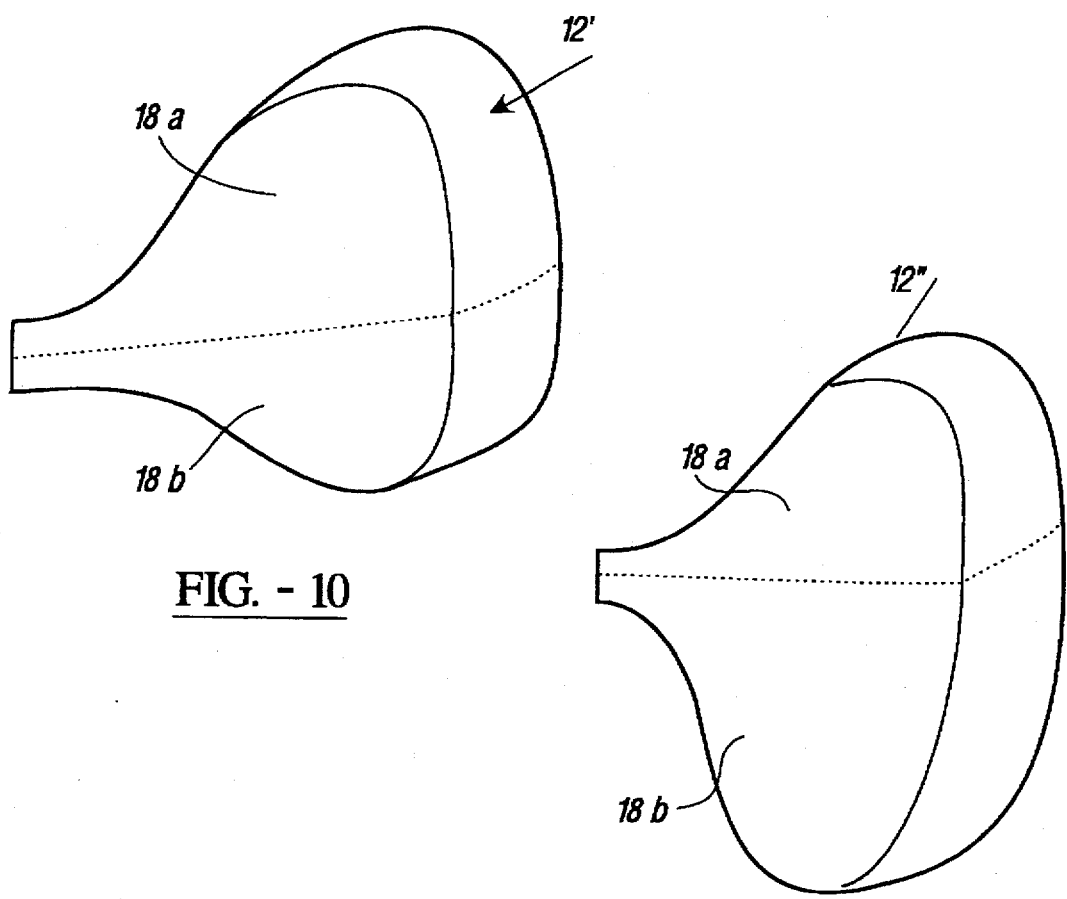
FIG. - 10
FIG. - 11

TWO PIECE AIR BAG WITH BUILT IN TETHER

SUMMARY OF THE INVENTION

The present invention relates to air bags and more particularly to an air bag constructed using only two pieces of fabric which are also used to form a tether.

Most air bags are constructed using a number of panels or pieces of material which are later sewn or otherwise joined together. The typical air bag used for driver protection uses at a minimum a face panel and a rear panel. If this bag also has a tether, one or two added panels of material are used. Passenger side air bags use a large number of panels sewn together to form the completed air bag. In the present invention the air bag including a tether is formed of only two panels of material. While the illustrated embodiment shows a passenger side air bag the technique can be used for all air bags.

OBJECTS OF THE INVENTION

Accordingly the invention comprises: an air bag comprising: two pieces of joined-together material defining a front face, two sides, a neck and a hollow tether. Each piece of material includes a center or body portion, a first leg extending on one side of the body portion, an opposite leg, a first side flap and an opposite second side flap extending outwardly from the body portion. A first seam joins the pieces along a first sewn line defining a line about which each opposite leg extends. Each opposite leg is joined at respective edges to edges of the first and second side flaps and edges of the first leg. Mounting holes are provided in the ends of the legs to provide for an overlapping attachment to corresponding mounting studs of an inflator or inflator housing.

It is an object of the invention to provide an air bag that is easy to manufacture and one that is formed of only two pieces of material.

Many other objects and purposes of the invention will be clear from the following detailed description of the drawings.

BRIEF DESCRIPTION OF THE DRAWINGS

In the drawings:

FIGS. 8 and 9 show inflation gas flow patterns within the air bag.

FIGS. 10 and 11 show alternate embodiments of the invention.

DETAILED DESCRIPTION OF THE DRAWINGS

Figure 1:
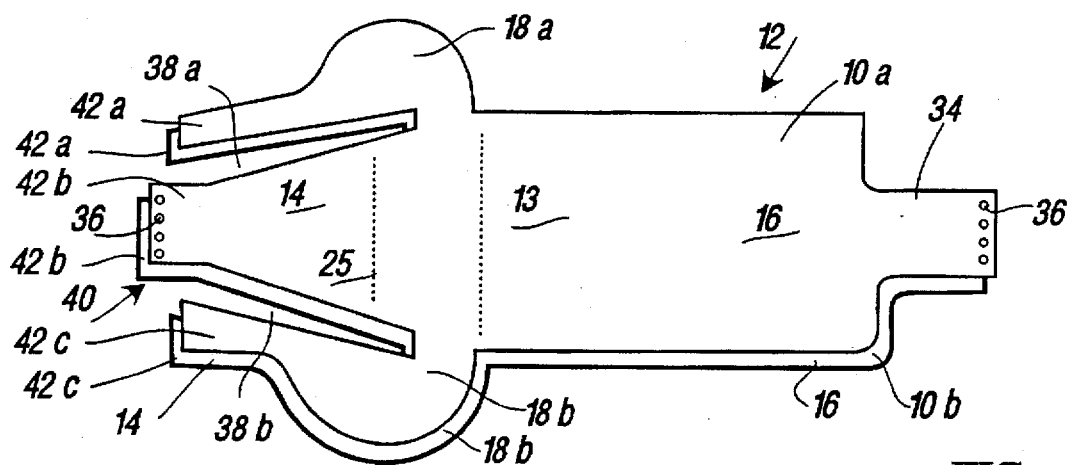
FIGS. 1–4 show various steps on the fabrication of an air bag in accordance with the present invention.

FIG. 1 is a plan view showing two pieces 10a,b of material, typically woven fabric, to be used to construct an air bag 12. Each piece is generally T-shaped having a center or body part 13, a first leg 14, and opposing second leg 16 and two lobes or side flaps 18a and 18b extending outwardly. As illustrated in FIG. 1 the second piece of material 10b is slightly visible under the first piece of material. As shown below it is not necessary that the side flaps of piece 10a be the same size as the side flaps of piece 10b. Legs 16 include a narrowed end 34 having a plurality of mounting openings or holes 36. The mounting holes 30 can be pre-cut in the fabric pieces 10a,b or fabricated after sewing. The narrowed end is flapped over an inflator or inflator housing. The left hand end of each piece 10a and 10b has two symmetrically shaped slots or cut-away portions 38a and 38b. The slots extend through leg 14 and partially through side flaps 18a,b of each piece 10a,b. As can be seen the end 40 of each leg 14 (of pieces 10a and 10b) is now segmented into parts 42a, b and c. The ends 27 of segments 42a and 42b may be foreshortened relative to segment 42b such that when these ends are sewn together the neck 48 of the air bag 12 will have short vertical sides 27a, 27b. The center segment 42b includes an additional plurality of mounting holes 36. When leg 16 is overlaid with leg 14 the holes 36 in each end 34 and 40 of each piece 10a,b of fabric are typically in registration.

Figure 2:
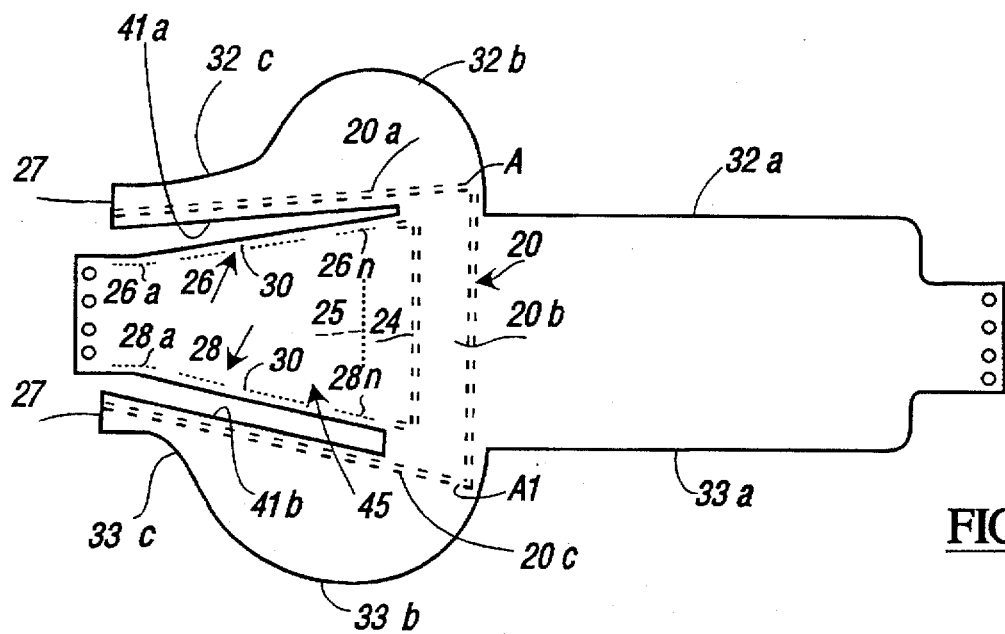

FIG. 2 shows the next step in the fabrication of the air bag 12. The two pieces 10a,b of material are overlaid and sewn together along a first seam 20 having sides 20a, 20b and 20c. The individual stitches of seam 20 are rather small to prevent inflation gas from escaping therefrom. Seam side 20a is along an edge 41a of each segment 42a, seam side 20b is at the edge 41b of each segment 40b and seam side 20c joins points A and A1 in each side flap 18a and 18b which lie slightly outside of the body or center portion 13. When the bag is completed seam side 20a (see FIG. 3) joins side flaps 18a of both pieces forming the left side 43a of the air bag, seam sides 20c join the side flaps 18b of each piece 10a,b together forming the right side 43b of the air bag. Seam side 20c forms the front of face side 43c of the air bag in association with parts of the center or body portion.

An additional seam 24 is sewn spaced from seam side 20b generally within the inner portion of center segment 42b. Segmented seams 26 and 28 each having respective segments 28a–26n and 29a–28n are provided along the other edges of the center segment 42b. The spaces 30 between each segmented portion of each segmented seam define gas flow passages from a tether into the inner portions of the main part of the formed air bag. These sewn-together center segments 42b of both pieces 10a,b of material define an integral, hollow tether 45. The center segments may each optionally include a line of perforations 25 which permit the tether to separate from the bag under certain high stress situations.

Figure 3:
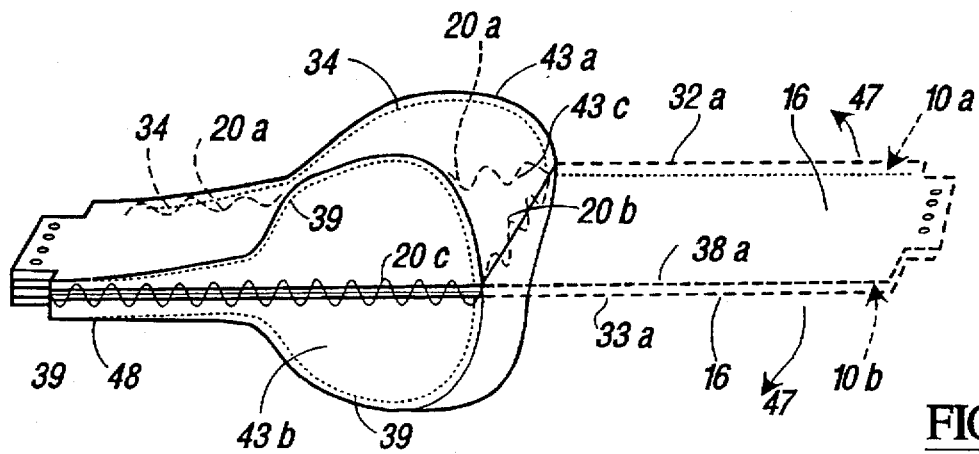
Figure 4:
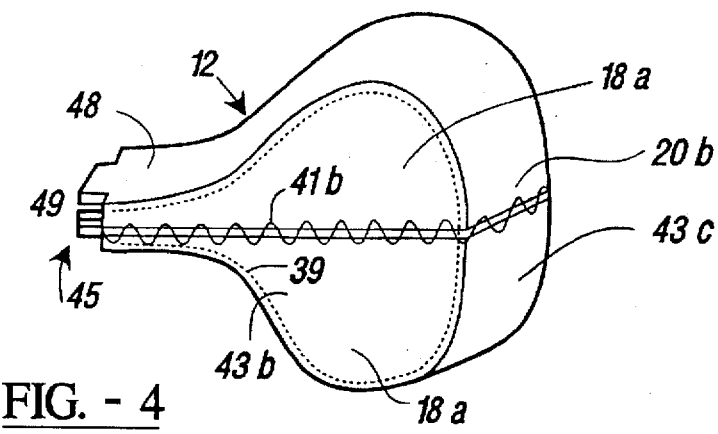

In this next fabrication step, shown in FIG. 3, each leg 16 (also shown as a phantom line laid flat, is rotated or moved (see arrows 47) about seam side 20c. The left hand side 32a of each leg 16 is sewn to the left hand edges of 32b and 32c of the side, flap 18a and of the leg 14 (outer edge of segment 42a) along sew line 34. Similarly the right hand edge 33a of leg 16 is sewn to the right hand edges 33b and 33c of side flap 18b and leg 14 (outer portion of segment 42c) along sew line 39. In some of the figures the pieces of material 10a,b are shown slightly apart and the seams 20a, 20b and 20c are slightly exaggerated for purposes of illustration. It should be appreciated that these pieces of material touch each other. The above operation is repeated for the lower material piece 10b. Upon completing the above procedure the air bag 12 has the general shape as illustrated in FIG. 4. It also should be appreciated that the length of each leg 16, in each piece 10a,b is long enough to be sewn or joined to the side flaps 18a,b and leg 14 (of the respective piece 10a,b of fabric) with its end 34 being generally parallel with the end of leg segment 42b.

Figure 5:
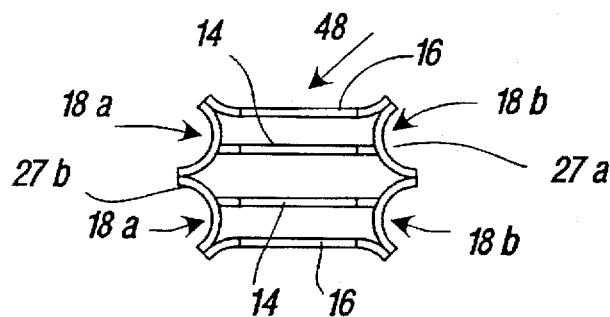
FIG. 5 is a plan view of a neck portion of an air bag.
Figure 6:
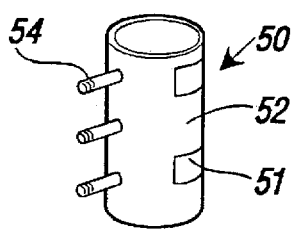
FIG. 6 shows an inflator housing.
Figure 7:
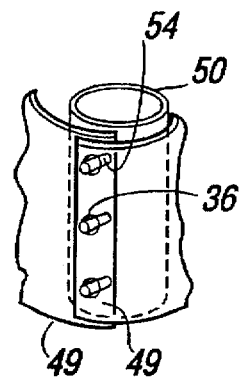
FIG. 7 shows the air bag wrapped about an inflator.

FIG. 5 is an end plan view of a neck portion of the air bag 12 showing the relationship to the various legs of the two pieces of fabric 10a,b and segments 42b forming the tether 45. As can be seen the neck 48 of the air bag is generally rectangular shaped. The two ends 36 of leg 16 of each piece 10a,b and the center part 42b of each of leg 14 of each piece 10a,b form flaps 49 which are placed in overlapping relation about mounting studs extending from an inflator or inflator housing. FIG. 6 shows one such typical inflator housing 50 having a cylindrical housing body 52 with a plurality of threaded studs 54 extending therefrom. FIG. 7 diagrammatically illustrates the overlapping of the flaps 49 about the housing with the studs 54 extending through the mounting holes 30.

Figure 8:
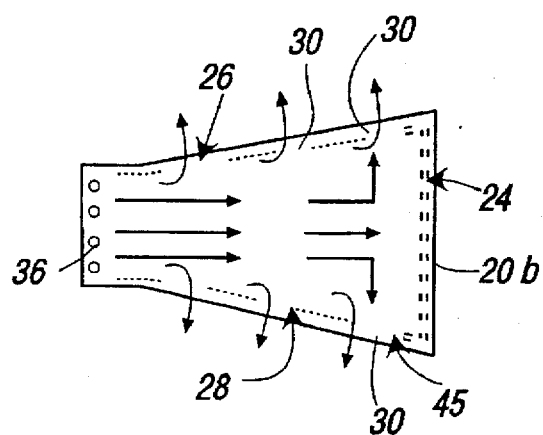

Reference is made to FIGS. 8 and 9. FIG. 8 is a sectional view between the two center end segments 42b of each leg showing the inflation gas flow pattern across the tether. FIG. 9 is an orthogonal, cut-away view of an inflated bag and also shows the inflation gas flow patterns across the tether and into the main part of the air bag.

Upon activation of an inflator positioned within the housing 50, inflation gas leaves the housing through various openings 51 and enters the neck of the air bag 12 and flows between the two layers of fabric forming the tether 45. It should be appreciated that the housing need not be closed as illustrated but may include an open side facing the face of the air bag. The inflation gas initially impinges on seam 24 and thereafter flows out of the holes 30 between the segmented seams 26 and 28 into the interior of the air bag against the sewn-together side flaps 18a and b of each fabric piece 10a,b and between the seams 20b, and 24 providing a forward facing cushion portion. As can be appreciated from the above the tether construction provides for the separation of the inflation gas flow within the air bag 12 in a predictable pattern due to the preconstruction of its side seams.

Reference is briefly made to FIGS. 10 and 11 which illustrate other air bags that can be made using the above technique. In contrast to the bag 12 shown in FIG. 4, having side flaps 18a and 18b in both pieces of material 10a,b of the same size, i.e. a balanced bag, the bag 12' of FIG. 10 is one in which the side flaps of 18a and 18b of piece 10a are considerably larger than the corresponding side flaps of piece 10b. This design would accommodate a vehicle with a high ceiling. The bag 12" of FIG. 11 may be useful in a vehicle with a lower ceiling as well as provide protection for the knees of the occupant.

Many changes and modifications in the above described embodiment of the invention can, of course, be carried out without departing from the scope thereof. Accordingly, that scope is intended to be limited only by the scope of the appended claims.

We claim:

1. An air bag (12) comprising:
    two pieces (10a,b) of joined-together material having a front face (43c), two sides (43a, 43b), a neck (48) and a hollow tether means for foreshortening of the air bag (45), wherein each piece (10a,b) of material includes a center portion (13), a first leg (14) extending to one side of the center portion, an opposite leg (16) extending oppositely from the center portion, a first side flap (18a) and an opposite second side flap (18b) extending outwardly relative to the center portion (13); a first seam joins the pieces along a first line defining a line from which each opposite leg extends, each opposite leg joined at respective edges to edges of the first and second side flaps and when so joined the opposite legs and flaps envelop the first leg.

2. The air bag air bag as defined in claim 1 wherein an end of each leg (14,16) includes mounting holes (30) for overlapping attachment to corresponding mounting studs.

3. The air bag as defined in claim 2 wherein the first leg is spaced from portions of the first and second flaps, forming part of the tether (45).

4. The air bag as defined in claim 1 wherein the tether means includes openings therethrough to distribute inflation gas into the air bag in a predictable manner via such openings.

5. The air bag as defined in claim 1 wherein the tether means includes perforation means for permitting the tether means to separate during air bag inflation.

6. An air bag (12) comprising:
    two pieces (10a,b) of material which when joined together defines a front face (43c), two sides (43a, 43b), a neck (48) of the air bag and also forms tether means for foreshortening of the air bag (45) upon deployment,
    wherein each piece (10a,b) of material includes a center portion (13), a first leg (14) of each piece extends to one side of the center portion, an opposite leg (16) extends oppositely from the center portion, a first side flap (18a) and an opposite second side flap (18b) extending outwardly relative to the center portion (13); each first side flap of each piece joined together along a first sew seam and each second flap joined together along a second sew seam, both the first and second sew seams are generally located between a respective flap and a first leg, a third seam extends generally across the center portion joining the two pieces along a line from which each opposite leg extends, each opposite leg joined at respective edges to edges of the first and second side flaps and when so joined the opposite legs and flaps form a main bag portion positioned about the first legs of each piece of material which are generally positioned facing each other, the facing first legs forming the tether means.

7. The air bag as defined in claim 6 wherein ends of each first leg are not joined to provide access to an interior space between the two first legs.

8. The air bag defined in claim 7 wherein an end of each leg (14,16) includes mounting holes (30) for attachment to corresponding mounting studs.

9. The air bag as defined in claim 8 wherein a first side of the first leg is spaced from the first sew seam joining the first flaps and a second side of the first leg is spaced from the second sew seam joining the second flaps.

10. The air bag as defined in claim 9 wherein the first sides of each first leg are sewn together forming a hollow tether.

11. The air bag as defined in claim 6 wherein the tether means includes an inlet portion formed by ends of the facing first legs and includes openings through which inflation gas can flow from the tether means into the main bag portion.

12. The air bag as defined in claim 6 wherein the tether means includes perforation means for permitting the tether means to separate during air bag inflation.

13. The air bag as defined in claim 9 including an air bag inflator within the hollow tether.

14. The air bag as defined in claim 11 including an air bag inflator within the inlet portion.

* * * * *